United States Patent [19]

Kane

[11] Patent Number: 5,699,591
[45] Date of Patent: Dec. 23, 1997

[54] SECURITY ANCHOR

[76] Inventor: Roger Kane, 645A Hembree Pkwy., Roswell, Ga. 30076

[21] Appl. No.: 654,591

[22] Filed: May 29, 1996

[51] Int. Cl.$^6$ .............................. E05B 73/00; F16G 11/00
[52] U.S. Cl. ........................... 24/304; 24/114.6; 24/3.13; 248/205.3
[58] Field of Search ........................... 24/304, 114.6, 24/3.13, DIG. 11; 70/18, 55, 58, 229; 248/205.3

[56] References Cited

U.S. PATENT DOCUMENTS

| | | | |
|---|---|---|---|
| 2,679,998 | 6/1954 | Keller | 248/205.3 |
| 2,793,887 | 5/1957 | Moore | 248/205.3 |
| 3,190,599 | 6/1965 | Margulis | 248/205.3 |
| 3,632,071 | 1/1972 | Cameron | 248/205.3 |
| 3,794,181 | 2/1974 | Canham | 248/205.3 |
| 4,432,120 | 2/1984 | Sherman, Jr. et al. | 24/304 |
| 4,566,924 | 1/1986 | Hara et al. | 24/114.6 |
| 4,616,113 | 10/1986 | Jank et al. | |
| 4,746,909 | 5/1988 | Israel et al. | |
| 5,072,213 | 12/1991 | Close | |
| 5,341,124 | 8/1994 | Leyden et al. | |
| 5,345,219 | 9/1994 | Rogers | |
| 5,349,834 | 9/1994 | Davidge | |

FOREIGN PATENT DOCUMENTS

| | | |
|---|---|---|
| 2 685 524 | 12/1991 | France |
| 34 22 845 | 1/1985 | Germany |

OTHER PUBLICATIONS

Rokan Corporation Advertisement Brochure, 1" by 1" "S" anchor, 1997.

Primary Examiner—Victor N. Sakran
Attorney, Agent, or Firm—Oliff & Berridge

[57] ABSTRACT

A security anchor attaches a cable to an article in order to prevent theft of the article. The security anchor includes a disk having a central area and radially extending slots that form wing portions of the disk. The wing portions are rotatable relative to each other to allow the disk to conform to curved surfaces. The security anchor further includes a dome attached to the central area of the disk. The dome houses an end of a cable so that when a force is applied to the cable the force is distributed evenly on the wing portions of the disk.

20 Claims, 3 Drawing Sheets

SECURITY ANCHOR

BACKGROUND OF THE INVENTION

1. Field of the Invention

The invention relates to a security anchor that readily adapts to curved surfaces of an article. The anchor allows for attaching a cable to the article to prevent theft of that article.

2. Description of Related Art

It is known to attach an anchor to an article to be protected against theft by adhering the anchor to the article and attaching one end of a cable or cord to the anchor. The other end of the cable or cord is attached to a fixed support so that the article can only be moved a limited distance from the fixed support. The anchor is usually plastic and has an adhesive backing layer to attach the anchor to the article. The adhesive is strong enough that a thief cannot readily peel the anchor from the article to detach the cable from the article. If the anchor cannot be readily peeled away from the article within 30-60 seconds, then this deters most thieves from trying to remove the anchor and steal the article.

Prior art adhesive backed security anchors only work well on flat surfaces of an article to be protected because the anchor is rigid and stays in one plane parallel to the surface of the article. However, when the article has curved surfaces (concave or convex surfaces), the anchor can be pulled off with much less force because the anchor can not readily flex to adapt to the curved surfaces. In addition, the non-resilient nature of the anchor urges the anchor to remain in its normal flat condition. Since the anchor can not be flexed to adapt to curved surfaces, the non-resilient forces keep portions of the anchor away from the curved surface, thus making the article susceptible to theft because the anchor can be peeled off easily.

SUMMARY OF THE INVENTION

An object of the invention is to provide a flexible security anchor with improved attachment ability.

A further object of the invention is to provide a security anchor able to conform to curved surfaces of the article to be protected while at the same time being able to take advantage of the tensile and shear strength of the adhesive.

An additional object is to provide a security anchor structured so that a force applied to the cable attached thereto is dispersed more or less evenly over the entire surface area of the security anchor and its attaching adhesive pad.

The above objectives are achieved by providing a security anchor in the form of a disk having slots extending radially to form four "wings" radiating from its core. The wings readily flex to allow the anchor to adapt more readily to curved (convex or concave) surfaces. The security anchor of the invention further includes a bullet-shaped dome centered on a top surface of the anchor and having a longitudinal slot extending from the top surface of the anchor to the apex of the dome. A ball-shaped stop-fitting on the end of the cable is housed within the dome. The cable can extend through the apex of the dome, or slide through the slot to lie flat against the top surface of the anchor.

BRIEF DESCRIPTION OF THE DRAWINGS

These and other aspects and advantages of the invention will become apparent from the following detailed description of a preferred embodiment when taken in conjunction with the accompanying drawings, in which.

DETAILED DESCRIPTION OF PREFERRED EMBODIMENT

While the invention will be described in conjunction with a preferred embodiment thereof, it will be understood that it is not intended to limit the invention to that embodiment. To the contrary, it is intended to cover all alternatives, modifications and equivalents that may be included within the spirit and scope of the invention as defined by the appended claims. For a general understanding of the features of the invention, reference is made to the drawings.

Figure 1:
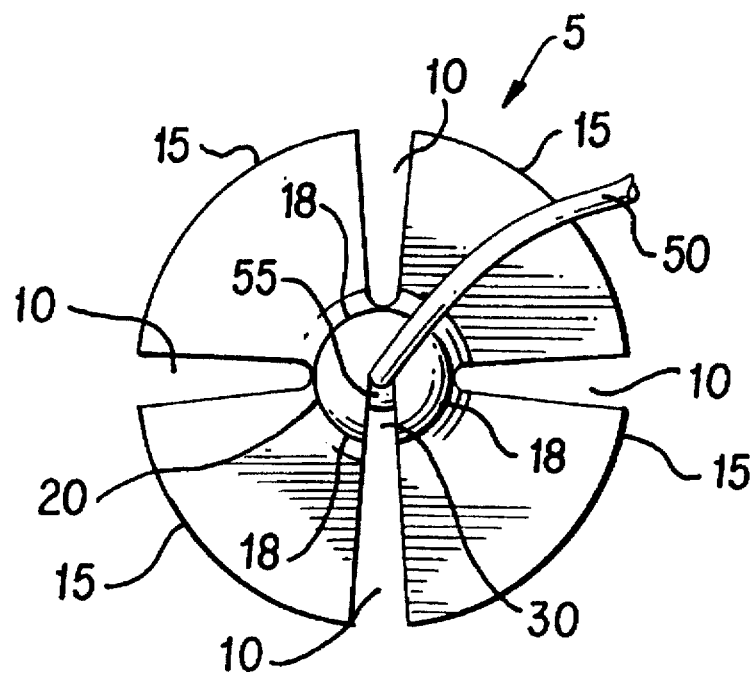
FIG. 1 is a top view of the security anchor of the invention with a cable extending from the anchor.
Figure 2:
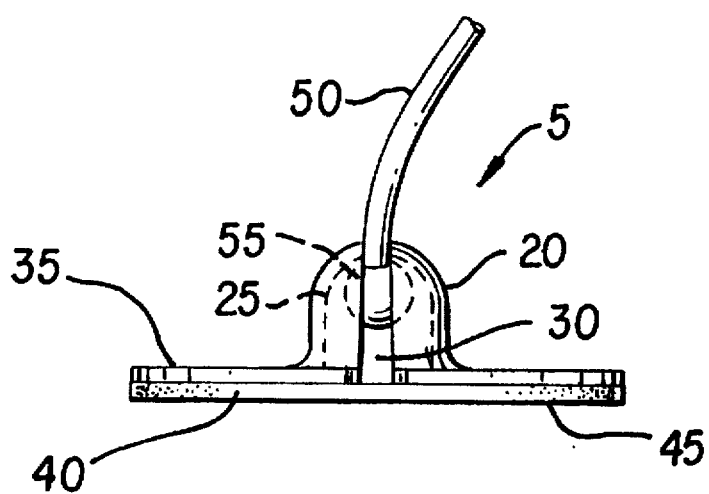
FIG. 2 is a side view of the security anchor of FIG. 1 with the interior of the dome shown in phantom.
Figure 3:
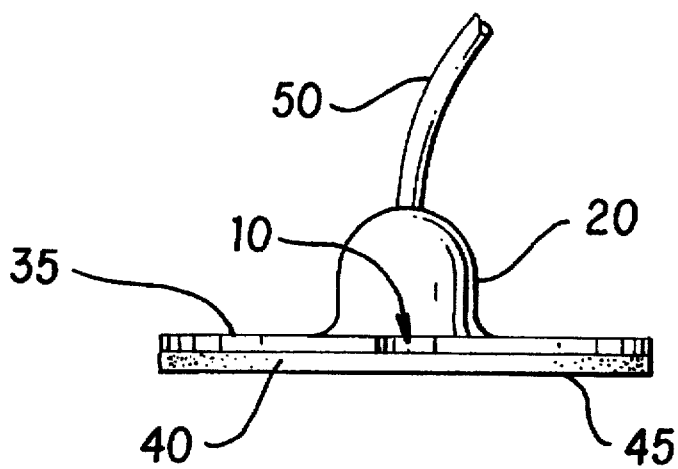
FIG. 3 is an opposite side view of the security anchor of FIG. 2.
Figure 4:
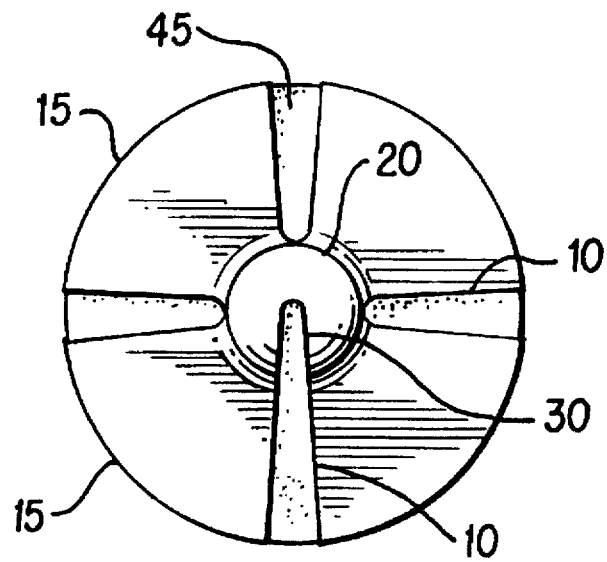
FIG. 4 is a top view of the anchor without the cable.
Figure 5:
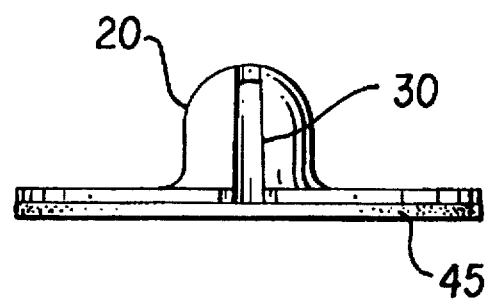
FIG. 5 is a side view of the anchor without the cable.
Figure 6:
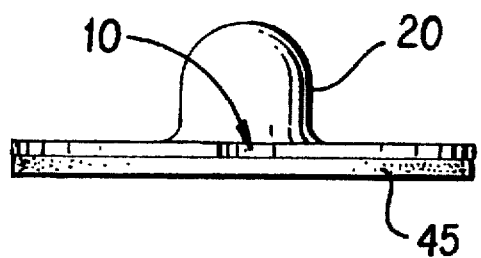
FIG. 6 is an opposite view of the anchor of FIG. 5 without the cable.
Figure 7:
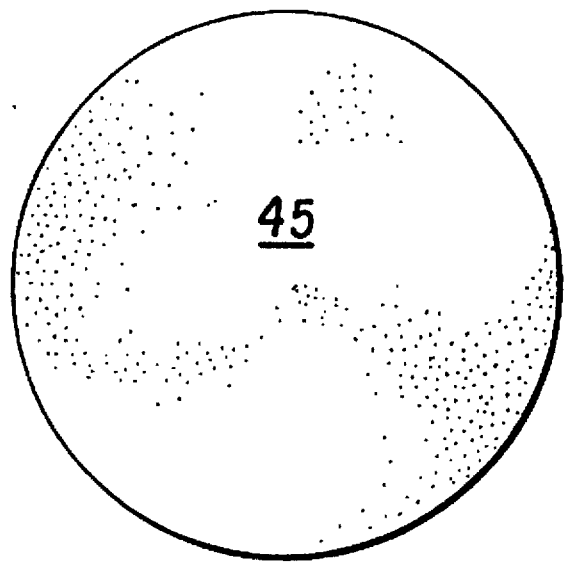
FIG. 7 is a bottom view of the security anchor.
Figure 8:
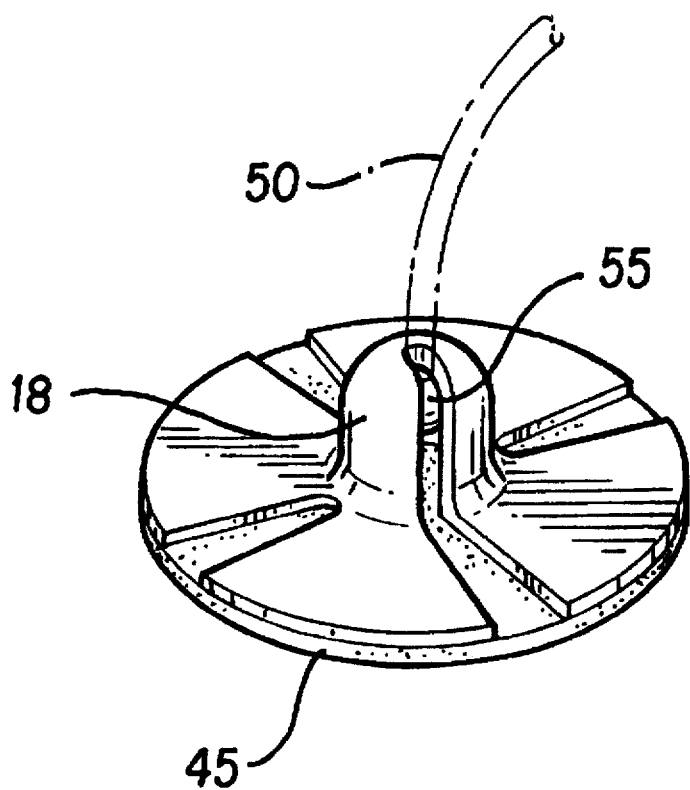
FIG. 8 is a perspective view of the security anchor.

FIG. 1 shows a security anchor 5 with a support structure for attaching a cable to an article (not shown). The support structure is preferably a plastic, resilient disk having four slots 10 that extend radially to form four "wing" portions 15 radiating from a central portion of the anchor 5. The slots 10 allow the anchor to conform to curved surfaces in both the X and Y planes allowing for attachment ability to non-planar or curved surfaces.

In particular, the slots 10 divide the anchor into the four wings 15 and the plastic material between the radial innermost ends of the slots defines four hinge areas 18. A hinge area 18 is located between each pair of adjacent slots so that each wing 15 has a corresponding hinge area 18. Each hinge area 18 allows the wing 15 to flex independent of an adjacent wing 15. When attaching the anchor to curved or non-planar surfaces, the wings can flex relative to each other to readily adapt to the curved or non-planar surfaces. For example, the wings can readily flex to accommodate curved surfaces that are concave or convex. One wing need not be in the same plane as another wing. The hinge area for the wing allows the wing to bend toward the surface of the article and provides less resilient force to urge the wing back to its original position. Therefore, the anchor does not peel away from the article, allowing the inventive security anchor to achieve a much stronger adhesive bond to the article being protected and thus be more successful in preventing the theft of article having curved or non-planar surfaces.

The anchor 5 includes a bullet-shaped dome 20 centered on a top surface 35 of the disk. The dome 20 has an inner cavity 25 within which a ball-shaped end 55 of a cable 50 is housed. A slot 30 extends in the longitudinal direction of the dome from the top surface 35 of the disk to the apex of the dome. This allows the cable 50 to move with respect to the security anchor 5. For example, the longitudinally extending slot 30 allows the cable 50 to extend upright through the apex of the dome 20, or to lie flat against the top surface 35 of the disk since the slot extends for the height of the dome 20. The ball end 55 is larger than the width of the slot 30 (and the slots 10) to retain the ball end 55 within the cavity. The ball end 55 and cable also can rotate about the longitudinal axis of the dome. The longitudinally extending slot 30 in the dome (the dome slot 30) intersects one of the slots 10 in the disk (the wing slots 10) for reasons explained below.

In a preferred embodiment of the invention, the diameter of the anchor 5 is 1.5" and the wing portions are 0.03" thick. The outer diameter of the bullet-shaped dome 20 is 0.375" at its base. A diameter of the inner cavity 25 is 0.250" and a height of the dome from the upper surface 35 of the disk to the top of the dome is 0.375". A diameter of each of the slots 10 is 0.093" adjacent the dome 20 and each slot has a width of 0.155" at an outer edge of the disk.

The anchor is made of a pliable material and is preferably injection molded out of polycarbonate material, such as LEXAN™. An adhesive material 45 corresponding in size to the disk 5 is applied to a lower surface 40 of the anchor so the anchor can be adhesively attached to an article to prevent theft of the article. Preferably, the adhesive material is #4951VHB manufactured by 3M. This adhesive material produces the strongest bond attainable by present technology. The adhesive material 45 need not have slots corresponding to the wing slots 10 because the adhesive material is flexible. However, slots could be provided if desired. The adhesive material 45 has a protective liner which is removed to expose the adhesive material, which can then be pressed against the article to adhere the anchor to the article.

To assemble the anchor, the cable 50 is threaded through the wing slot 10 that intersects the dome slot 30 with the ball end 55 below the lower surface 40 of the disk. After the ball end 55 is located within the inner cavity of the dome, the adhesive material is applied against the lower surface 40 of the disk to trap the ball end 55 of the cable within the dome. The liner can then be removed to adhere the anchor to the article. As explained above, the hinge area 18 of each wing 15 allows any one wing to be located in a plane different from another wing 15. Therefore, the slotted anchor can readily adapt to curved or non-planar surfaces.

Since the cable 50 is placed into the center of the disk, as one pulls on an end of it, the pulling force is dispersed more or less evenly over the entire surface area of the four "wing" portions 15. With this structure, the adhesive will not give up its bond without great force as the structure permits the shear and tensile strength capabilities of the adhesive to come into play. When someone pulls on the cable 50 to remove the anchor 5, the cable 50 will immediately stand upright in the dome 20 thus assuring that the force being spent on pulling the anchor 5 off the item will be centered on the anchor 5 and then radiate outward over the four "wing" portions 15. This utilizes the tensile strength of the adhesive. If the tension force is applied to the side of the anchor (i.e., the cable does not extend through the apex of the dome), the shear strength of the adhesive is still strong enough to resist the pulling force.

To remove the anchor, at least two adjacent wings must be peeled up before the rest of the disk can be pulled off using the cable as a grip. Because this action takes some amount of time, this should deter most thieves from removing the anchor. The anchor is designed to be disposable and will, under most circumstances, be destroyed when removed from an article. For example, to remove the anchor, one could grip the dome with pliers and twist off the dome to break the anchor and free the cable. Portions of the anchor remaining on the article could then be removed by peeling those portions off the article, from the center outward.

The wing slot 10 that intersects the dome slot 30 must have a width slightly larger than the outside diameter of the cable so that the cable can be threaded through the slots 10, 30 to locate the ball end of the cable within the inner cavity of the dome. However, the other wing slots 10 need not be as large, and could be thinner slots like a cut or slit.

While the invention has been described in conjunction with a preferred embodiment thereof, it is evident that many alternatives, modifications and variations may be apparent to those skilled in the art. For example, more or less than four slots could be provided to create a different number of wings. Plastic material for the disk is preferred, but other materials can be used. Also, while the anchor is preferably circular, other shapes are available. Accordingly, the invention is intended to embrace all alternatives, modifications and variations which may fall within the spirit and broad scope of the appended claims.

What is claimed is:

1. A security anchor for preventing theft of an article, comprising:
   a support structure having a cavity therein for attaching a cable to an article to be protected against theft, a first surface through which the cable extends and a second surface opposite the first surface and having an adhesive layer for attachment to the article;
   a plurality of wing slots within the support structure to divide the support structure into a corresponding plurality of wings, each wing being defined between an adjacent pair of wing slots, one of the plurality of wing slots communicating with the cavity for attaching one end of the cable to the support structure; and
   a hinge area for each wing located between the adjacent pair of wing slots, the hinge area allowing one wing to flex independently of another wing to allow the support structure to conform to curved surfaces on the article.

2. The security anchor of claim 1, wherein the support structure is a disk and the cable and hinge area are located in a central portion of the disk.

3. The security anchor of claim 2, wherein the plurality of slots extend radially outward from the central portion of the disk.

4. The security anchor of claim 2, wherein the plurality of slots are symmetrically arranged around the central portion of the disk.

5. The security anchor of claim 2, further comprising a dome attached to the first surface and located in the central portion of the disk, the dome including the cavity for attaching the cable to the disk.

6. The security anchor of claim 5, wherein the dome has a dome slot extending in a longitudinal direction of the dome from the first surface to an apex of the dome, the dome slot communicating with the cavity of the dome and the cable extending through the dome slot.

7. The security anchor of claim 6, wherein the dome slot intersects one of the plurality of wing slots.

8. The security anchor of claim 6, wherein a tension force on the cable moves the cable within the dome slot to the apex of the dome to center the tension force and disperse the tension force substantially equally among the plurality of wings.

9. The security anchor of claim 1, wherein the support structure is a plastic material.

10. The security anchor of claim 9, wherein the support structure is injection molded and the material is polycarbonate material.

11. A security anchor for preventing theft of an article, comprising:
    a plastic resilient disk for attaching a cable to an article to be protected against theft, the disk having a first surface through which the cable extends and a second surface opposite the first surface and having an adhesive layer for attachment to the article; and
    a dome projecting from the first surface and located in a central portion of the disk, the dome having an inner cavity and a dome slot extending in a longitudinal direction of the dome from the first surface to an apex of the dome, the dome slot communicating with the inner cavity of the dome and the cable extending through the dome slot such that a tension force on the cable to urge the disk to detach from the article moves the cable within the dome slot to the apex of the dome to center the tension force on the disk.

12. The security anchor of claim 11, further comprising a plurality of wing slots extending radially outward from the central portion of the disk and dividing the disk into a corresponding plurality of wings, the tension force being dispersed substantially equally among the plurality of wings.

13. The security anchor of claim 12, wherein the dome slot intersects one of wing slots.

14. A method of securing an article against theft by securing a cable to the article, the method comprising the steps of:

adhering a support structure to the article, the support structure having a cavity for attaching a cable to an article to be protected against theft, a first surface through which the cable extends, and a second surface opposite the first surface and having an adhesive layer for attachment to the article, the support structure including a plurality of wing slots for dividing the support structure into a corresponding plurality of wings, one of the plurality of slots communicating with the cavity for attaching one end of the cable to the support structure; and flexing one wing independently of another wing to allow the support structure to adhere to curved surfaces of the article.

15. The method of claim 14, further comprising the steps of forming a dome on a central portion of the support structure for retaining an end of the cable;

extending the cable through a dome slot in the dome that extends from the first surface of the support structure to an apex of the dome;

moving the cable within the dome slot to the apex of the dome when a tension force is applied to the cable to evenly distribute the tension force among the plurality of wings.

16. A security anchor for preventing theft of an article, comprising:

a plate for attaching a cable to an article to be protected against theft, the plate having a first surface through which the cable extends and a second surface opposite the first surface and having an adhesive layer for attachment to the article; and a support structure on the first surface, the support structure having an inner cavity and a slot extending in a longitudinal direction of the support structure to a top of the support structure, the slot communicating with the inner cavity of the support structure and the cable extending through the slot such that a tension force on the cable to urge the plate to detach from the article moves the cable within the slot to the top of the support structure to center the tension force of the plate.

17. The security anchor of claim 16, further comprising a plurality of wing slots within the support structure to divide the support structure into a corresponding plurality of wings, each wing being defined between an adjacent pair of wing slots, one of the plurality of wing slots communicating with the cavity for attaching one end of the cable to the support structure.

18. The security anchor of claim 17, further comprising a hinge area for each wing located between the adjacent pair of wing slots, the hinge area allowing one wing to flex independently of another wing to allow the support structure to conform to curved surfaces on the article.

19. The security anchor of claim 16, wherein the slot extends from the first surface to the top of the support structure to allow the cable to move within the slot to allow a portion of the cable to lie against the first surface.

20. A security anchor for preventing theft of an article, comprising:

a plate for attaching a cable to an article to be protected against theft, the plate having a first surface through which the cable extends and a second surface opposite the first surface and having an adhesive layer for attachment to the article; and a support structure on the first surface, the support structure having an inner cavity and a slot extending in a longitudinal direction of the support structure toward a top of the support structure, the slot communicating with the inner cavity of the support structure and the cable extending through the slot such that the cable can move within the slot to allow a portion of the cable to lie against the first surface.

* * * * *